United States Patent
Fokema et al.

(10) Patent No.: US 7,309,416 B2
(45) Date of Patent: Dec. 18, 2007

(54) METHODS AND COMPOSITIONS FOR DESULFURIZATION OF HYDROCARBON FUELS

(75) Inventors: Mark D. Fokema, Framingham, MA (US); Wendell E. Rhine, Belmont, MA (US); Neng Ye, Boxborough, MA (US); Kang P. Lee, Sudbury, MA (US); Jennifer P. Gordon, Brighton, MA (US)

(73) Assignee: Aspen Products Group, Inc., Marlborough, MA (US)

( * ) Notice: Subject to any disclaimer, the term of this patent is extended or adjusted under 35 U.S.C. 154(b) by 417 days.

(21) Appl. No.: 10/617,912

(22) Filed: Jul. 11, 2003

(65) Prior Publication Data
US 2007/0175798 A1 Aug. 2, 2007

(51) Int. Cl.
*C10G 29/00* (2006.01)
(52) U.S. Cl. ............ 208/243; 208/67; 208/120.01; 208/208 R; 208/211; 208/299; 208/303
(58) Field of Classification Search ............ 208/303, 208/208 R, 299, 211, 67, 120.01, 243
See application file for complete search history.

(56) References Cited

U.S. PATENT DOCUMENTS

| | | | |
|---|---|---|---|
| 2,574,445 A | 11/1951 | Porter et al. | |
| 2,618,586 A | 11/1952 | Hendel | |
| 3,063,936 A | 11/1962 | Pearce et al. | 208/211 |
| 4,179,361 A | 12/1979 | Michlmayr | 208/244 |
| 4,202,865 A | 5/1980 | Preston, Jr. | 423/244 |
| 4,246,244 A | 1/1981 | Fox | 423/225 |
| 4,313,820 A | 2/1982 | Farha et al. | 208/213 |
| 4,464,252 A * | 8/1984 | Eberly et al. | 208/243 |
| 4,725,415 A | 2/1988 | Kidd | 423/230 |
| 4,911,823 A * | 3/1990 | Chen et al. | 208/67 |
| 4,977,123 A | 12/1990 | Flytzani-Stephanopoulos | 502/84 |
| 5,124,140 A | 6/1992 | Okada et al. | 423/650 |
| 5,130,115 A | 7/1992 | Fujisou et al. | 423/652 |
| 5,157,201 A | 10/1992 | Norris | 585/820 |

(Continued)

FOREIGN PATENT DOCUMENTS

WO WO 02/22763 A1 3/2002

(Continued)

OTHER PUBLICATIONS

Brooks, et al., "Desulfurization Over Metal Zeolites". *Sep. Sci. Tech.*, 25: 1817-1828 (1990).

(Continued)

*Primary Examiner*—Glenn Caldarola
*Assistant Examiner*—Prem C. Singh
(74) *Attorney, Agent, or Firm*—Mintz, Levin, Cohn, Ferris, Glovsky and Popeo, P.C.

(57) ABSTRACT

Sulfur is removed from a hydrocarbon fuel via contact with a desulfurization agent; the desulfurization agent is then regenerated (wherein sulfur is released) by exposing it to oxygen. The sulfur removal and regeneration processes each can be carried out at relatively moderate temperatures, e.g., from 300 to 600° C., and pressure, e.g., about 0.79 to about 3.5 MPa; and the desulfurization agent can include a transition metal oxide, such as molybdenum oxide. The process can also include the additional steps of cracking the hydrocarbon, separating high-boiling and low-boiling fractions from the reaction product and contacting the lower-boiling fraction with a secondary desulfurization agent.

26 Claims, 2 Drawing Sheets

U.S. PATENT DOCUMENTS

| | | | | |
|---|---|---|---|---|
| 5,254,516 | A | 10/1993 | Gupta et al. | 502/84 |
| 5,360,536 | A | 11/1994 | Nemeth et al. | 208/248 |
| 5,401,391 | A | 3/1995 | Collins et al. | 208/208 |
| 5,494,880 | A | 2/1996 | Siriwardane | 502/400 |
| 5,685,890 | A | 11/1997 | Okada et al. | 48/214 |
| 5,686,196 | A | 11/1997 | Singh et al. | 429/17 |
| 5,807,475 | A | 9/1998 | Kulparathipranja et al. | 208/208 |
| 5,938,800 | A | 8/1999 | Verrill et al. | 48/127.9 |
| 6,159,256 | A | 12/2000 | Bonville, Jr. et al. | 48/61 |
| 6,184,176 | B1* | 2/2001 | Khare | 502/407 |
| 6,245,221 | B1 | 6/2001 | Baird et al. | 208/213 |
| 6,274,533 | B1 | 8/2001 | Khare | 502/343 |
| 6,299,994 | B1 | 10/2001 | Towler et al. | 429/17 |
| 6,338,794 | B1 | 1/2002 | Khare | 208/247 |
| 6,416,659 | B1 | 7/2002 | Groten et al. | 208/213 |
| 6,454,935 | B1 | 9/2002 | Lesieur et al. | 208/244 |
| 6,482,314 | B1 | 11/2002 | Khare | 208/244 |
| 6,558,533 | B2 | 5/2003 | Schmidt et al. | 208/244 |
| 6,579,444 | B2 | 6/2003 | Feimer et al. | 208/243 |
| 2001/0027163 | A1 | 10/2001 | Khare | 502/400 |
| 2003/0032555 | A1 | 2/2003 | Dodwell | 502/400 |
| 2004/0118747 | A1* | 6/2004 | Cutler et al. | 208/208 R |

FOREIGN PATENT DOCUMENTS

| | | |
|---|---|---|
| WO | WO 03/020850 A2 | 3/2003 |

OTHER PUBLICATIONS

Gasper-Galvin, et al., "Zeolite-Supported Metal Oxide Sorbents for Hot-Gas Desulfurization", *Ind. Eng. Chem. Res.*, 37: 4157-4166 (1998).

Jothimurugesan, et al., "Regeneration of Zinc Titanate $H_2S$ Sorbents", *Ind. Eng. Chem. Res.*, 37: 1929-1933 (1998).

Li, et al., "Cu-Cr-O and Cu-Ce-O Regenerable Oxide Sorbents for Hot Gas Desulfurization", *Ind. Eng. Chem. Res.*, 36: 187-196 (1997).

Sasaoka, et al., "Modification of $ZnO$-$TiO_2$ High-Temperature Desulfurization Sorbent by $ZrO_2$ Addition", *Ind. Eng. Chem. Res.*, 38: 958-963 (1999).

Swisher, et al., "Review of Metals and Binary Oxides as Sorbents for Removing Sulfur from Coal-Derived Gases", *J. Mater. Eng. Perf.*, 1: 399-408 (1992).

International Search Report for PCT/US2004/021172, mailed Feb. 22, 2005.

Written Opinion of the International Searching Authority, mailed Feb. 22, 2005.

International Preliminary Report on Patentability for PCT/US2004/021172, mailed Jun. 30, 2005.

\* cited by examiner

Original Diesel

FIG. 4

Processed Diesel

FIG. 5

Original Diesel

FIG. 6

Processed Diesel

METHODS AND COMPOSITIONS FOR DESULFURIZATION OF HYDROCARBON FUELS

GOVERNMENT SUPPORT

The invention was made with Government support under Contract DAAH01-99-C-R170 awarded by the US Army Aviation Missile Command. The Government has certain rights in the invention.

BACKGROUND

Hydrocarbon fuels generally contain sulfur in the form of organosulfur compounds at sulfur concentrations ranging from less than 10 ppm to greater than 1% by weight. When the fuel is combusted in internal combustion engines, the sulfur is emitted as sulfur oxides ($SO_x$), which are primary constituents of acid rain. The presence of sulfur has a significant effect on the amount of particulate matter (PM) emitted from diesel engines, as sulfur acts as an initiator for soot formation. Nitrogen oxide ($NO_x$) emissions from engines are also affected by the sulfur content of the fuel, because sulfur adversely affects $NO_x$ emission control catalysts. In advanced power generation devices, such as fuel cells, sulfur acts as a poison for many of the catalytic components of the fuel cell, thereby limiting the applicability of these devices.

There is a well-established hierarchy to the ease with which various organosulfur compounds can be removed from petrochemical streams. Simple aliphatic, naphthenic, and aromatic mercaptans, sulfides, di- and polysulfides and the like surrender their sulfur more readily than the class of heterocyclic sulfur compounds comprised of thiophene and its higher homologs and analogs. Within the generic thiophenic class, desulfurization reactivity decreases with increasing molecular structure and complexity. While simple thiophenes represent the more labile sulfur types, the other extreme, sometimes referred to as "refractory sulfur" is represented by the derivatives of dibenzothiophene, especially those mono- and di-substituted dibenzothiophenes bearing substituents on the carbons beta to the sulfur atom. These highly refractory sulfur heterocycles resist desulfurization as a consequence of steric hindrance that precludes the requisite catalyst-substrate interaction. For this reason, these materials survive traditional desulfurization processes and may poison subsequent processes whose operability is sulfur sensitive.

Techniques for the removal of sulfur from hydrocarbon fuels can be divided into the following four general categories: 1) hydrodesulfurization, which can be characterized by the conversion of organically bound sulfur to $H_2S$ in the presence of hydrogen; 2) cracking, which can be characterized by the conversion of organically bound sulfur to $H_2S$; 3) chemical absorption, which can be characterized by the abstraction of sulfur from the fuel at moderate temperature; and 4) physical absorption, which can be characterized by the removal of sulfur-containing compounds from the fuel at low temperature.

Prior to use, petroleum distillates are generally hydrotreated (hydrodesulfurized) to reduce the concentration of sulfur compounds. In the hydrodesulfurization (HDS) process, the petroleum distillate is treated with excess hydrogen at high pressure and elevated temperature over a catalyst. The catalyst typically is based on cobalt-molybdenum sulfides or on nickel-molybdenum sulfides, with additives known in the art. Under HDS conditions, organosulfur compounds react with hydrogen to produce $H_2S$ and smaller organic fragments, and aromatics are hydrogenated. Deeply-hydrotreated petroleum products, such as those sold in the U.S. and Europe, contain sulfur mainly in the fractions boiling above approximately 300° C. These compounds are the alkylated dibenzothiophenes, and those with alkylation on the carbon next to the sulfur atom are most difficult to remove by HDS.

While HDS is well suited for large stationary applications, it does not readily lend itself to distributed power generation applications due to system size, cost and complexity. High-pressure hydrogen (greater than 500 psig or greater than about 3.5 MPa) is generally necessary when using HDS to perform deep desulfurization of the feedstock, necessitating an auxiliary supply of hydrogen or significant hydrogen recycle if the desulfurization system is coupled to a fuel reformer to generate hydrogen. Destruction of the most refractory sulfur species can be accomplished under relatively severe process conditions, but this may prove to be undesirable owing to the onset of harmful side reactions leading to high aromatic content and carbonaceous deposits.

The drawbacks of HDS include the following: 1) the sensitivity of the catalyst to a great many subtle process parameters, any of which may reduce its lifetime and/or activity; 2) the necessity of pretreating the catalyst with a sulfur-containing stream prior to use in order to form the required metal sulfide phases; 3) the non-regenerable nature of the catalyst; 4) the large quantities of high-pressure hydrogen that are required to push the HDS reaction to completion; and 5) the difficulty of removing alkylated dibenzothiophenes by this process, particularly in terms of requiring conditions that are much more severe and that substantially raise the fuel cost and reduce fuel production rates. The severe conditions needed for the removal of alkylated dibenzothiophenes include requirements of pressures greater than 1000 psig (7.0 MPa) as well as greater hydrogen supply to the HDS process.

Sulfur can also be removed from hydrocarbon fuel by thermally or catalytically cracking the organosulfur compounds into $H_2S$ and other small hydrocarbon fragments, for example by contacting a hydrocarbon stream with a fluidized bed of an acidic catalyst.

A drawback to the use of HDS or cracking for desulfurization is that in applications distanced from a refinery (distributed or small- to mid-scale power generation), the byproduct $H_2S$ must be converted to a more benign species prior to disposal or emission. Separation of the hydrogen sulfide from a desulfurized liquid fuel stream can be carried out in a liquid-gas separator or by using alkaline absorbents. Other approaches to $H_2S$ separation include the use of a solvent specific for $H_2S$ to transport $H_2S$ out of a gas stream, the use of a $H_2S$-permeable membrane to effect the separation, and the use of molecular sieves to absorb $H_2S$ from a gas stream and release it to an effluent stream.

Removal of $H_2S$ from the desulfurized hydrocarbon fuel stream may also be accomplished through chemical absorption of the $H_2S$. Much of the existing art for removal of $H_2S$ from a petroleum-based feed gas stream focuses on the use of a transition metal oxide that absorbs $H_2S$ at moderately high temperatures (200-600° C.) according to the following reaction:

$$MO_x + xH_2S \rightarrow MS_x + xH_2O, \qquad (1)$$

where M is commonly Zn, Cu, Ni, or Fe.

In theory, the absorbent may be regenerated by air oxidation of the metal sulfide according to the following reaction:

$$MS_x + 3x/2 O_2 \rightarrow MO_x + xSO_2. \quad (2)$$

However, the metal sulfate is commonly an intermediate when the regeneration is carried out at low to moderate temperatures, and is a thermodynamic sink. This limits the use of the metal oxide absorbent to only one or a few regeneration cycles if regeneration is to occur at moderate temperatures. Temperatures in excess of 625° C. are required to regenerate ZnO from ZnS without formation of $ZnSO_4$. Zinc oxide absorbents are the most popular for removal of $H_2S$ from, for example, hot sour gas streams. Zinc titanate based absorbents have been shown to be slightly more regenerable than ZnO.

Hydrogen sulfide absorbents that bind hydrogen sulfide through physical adsorption may also be used to remove $H_2S$ from fuel streams. These absorbents are generally regenerable through manipulation of the process temperature, pressure, and/or gas rate so that the absorbent cycles between adsorption and desorption stages. Such absorbents may include zeolitic materials, spinels, meso- and microporous transition metal oxides, particularly oxides of the fourth period of the Periodic Chart of the Elements.

Direct chemical absorption of organosulfur compounds without use of $H_2S$ intermediates is the third manner in which sulfur-containing fuels can be desulfurized. Some of these direct chemical absorption methods occur in the presence of hydrogen supplied via a hydrogen co-feed, and regeneration of the absorbent may require a particularly high temperature and an absorbent reduction step prior to re-use of the absorbent. Some of the absorbents useful for $H_2S$ absorption have also been shown to be applicable to this direct desulfurization technique. Zinc oxide, manganese oxide and iron oxide have been cited as useful absorbents. While a number of references that discuss direct chemical absorption disclose that metal and metal oxide absorbents can be used to desulfurize fuels, these references do not disclose regenerability of these types of absorbents, and the applicability of direct chemical absorption methods to desulfurization of substituted dibenzothiophenic compounds is not disclosed.

Low-temperature physical absorption of organosulfur compounds is another manner in which the sulfur content of hydrocarbon streams can be reduced. For example, one method uses zeolites and clays to remove sulfur-containing compounds from gasoline at ambient temperature. Unless provisions are made to regenerate the low-temperature absorbent beds, these systems may become prohibitively large when processing high sulfur content fuels.

SUMMARY

Although the above-described methods provide a variety of approaches in removing sulfur or sulfur-containing compounds, methods of this disclosure offer a number of unique advantages not found in existing methods. In particular, methods of this disclosure can be used to effectively remove the more-refractory organosulfur compounds from a hydrocarbon fuel via a compact apparatus in a reliable manner; more particularly, these methods can be practiced to do so using moderate process conditions and without needing to add hydrogen to the hydrocarbons.

In methods described in greater detail, below, a desulfurization agent removes sulfur from sulfur-containing hydrocarbons in the hydrocarbon fuel. The hydrocarbon fuel can be, e.g., gasoline, kerosene, diesel fuel, jet fuel, heating oil, or combinations thereof. Because sulfur accumulates in the regenerable absorbent, there is a finite amount of fuel that the absorbent can process before its activity decreases to an impractical level. Following sulfur absorption, the activity of the regenerable absorbent can be increased to its original level via "regeneration" by exposing the absorbent to flowing air (or other sources of oxygen gas) at a moderate temperature. Upon exposure to the oxygen in the regeneration process, sulfur is released from the desulfurization agent, thereby renewing the ability of the desulfurization agent to again remove sulfur from sulfur-containing hydrocarbon compounds.

The desulfurization agent can include a transition metal oxide, such as molybdenum oxide, impregnated into a porous support, formed, e.g., of alumina. The surface area of the desulfurization agent can be greater than 150 $m^2/g$, and the pore volume of the desulfurization agent can be greater than 0.45 $cm^2/g$. The sulfur removal and regeneration processes can each be carried out at relatively moderate temperatures, e.g., from 300 to 600° C., and at a moderate pressure, e.g., about 0.79 to about 3.5 MPa; moreover sulfur removal and regeneration of the desulfurization agent can be carried out at substantially the same temperature. Furthermore, additional hydrogen need not be fed into the system to effectively carry out any aspect of the process.

In a particular embodiment of the overall process, a hydrocarbon fuel is cracked to reduce its molecular weight before or simultaneously with the desulfurization agent removing sulfur from the fuel. The cracking catalyst helps to break apart the sulfur-containing molecules to produce smaller molecules from which the sulfur can more easily be taken up by the regenerable absorbent. Depending upon the ultimate use of the desulfurized fuel, the cracking component may also make the fuel easier to process (e.g., steam reform, partially oxidize, combust, etc.) due to the lower molecular weight of the fuel.

After sulfur removal, a separator is used downstream from the desulfurization agent to separate a higher-boiling fraction and a lower-boiling fraction from the reaction product. The lower-boiling fraction can then be further desulfurized by passing it through a secondary desulfurization agent, the output of which can be used as a fuel in, for example, conventional heat and power generation devices or in advanced power generation devices, such as a fuel cell.

The regenerable absorbent removes the majority of the sulfur from the fuel, and use of the separator to reject a portion of the higher-boiling compounds further reduces the sulfur content of the lower-boiling stream before the secondary absorbent is finally used to further reduce the sulfur content of the lower-boiling stream. If less sulfur removal is desired, the secondary absorbent and/or separator can be omitted from the sulfur removal system.

Many of the other features of the present invention will become manifest to those versed in the art, upon making reference to the detailed description, which follows, and the accompanying sheets of drawings in which particular embodiments incorporating the principals of this invention are disclosed as illustrative examples only.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

DETAILED DESCRIPTION

Regenerable desulfurization agents, described herein, are capable of abstracting (removing) sulfur from refractory organosulfur compounds, including thiophene, substituted thiophenes, benzothiophene, substituted benzothiophenes, dibenzothiophenes and substituted dibenzothiophenes. In contrast to earlier desulfurization materials, these desulfurization agents can abstract sulfur from refractory organosulfur compounds at moderate temperature and at moderate pressure in the absence of hydrogen; and the desulfurization agent can be fully regenerated by exposing it to air at a temperature that is substantially the same as that at which the desulfurization agent abstracts sulfur from the fuel. While the temperature may not remain precisely static, no active steps are taken to raise or lower the temperature. Without wishing to be bound by any particular theory, it appears that metal or metal oxide species are converted to metal sulfides during desulfurization, and that the metal sulfides are converted back to metal oxide species during the regeneration process. In the presence of a reducing, sulfur-containing gas, the Gibbs free energy of the chemical system is minimized if the metal or metal oxide converts to the corresponding metal sulfide. In the presence of an oxidizing gas, the Gibbs free energy of the chemical system is minimized if the metal sulfide transforms to the corresponding metal oxide.

Figure 1:
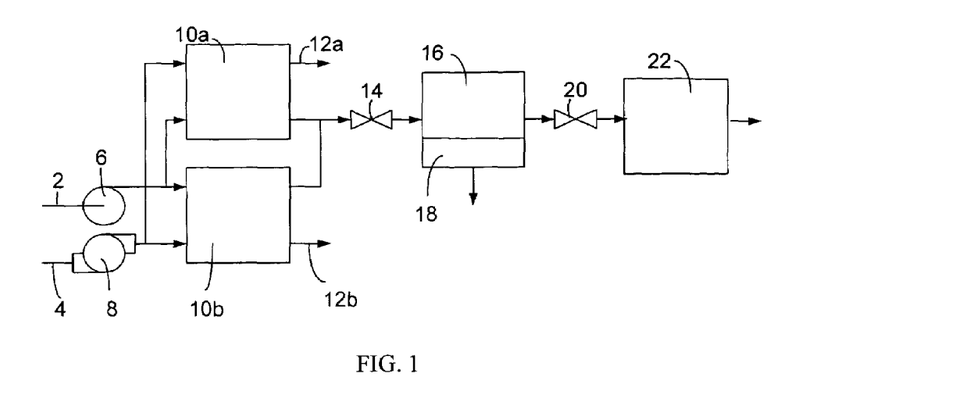
FIG. 1 is a diagram of desulfurization system.

FIG. 1 is a schematic view of a sulfur removal system suitable for use with sulfur-laden hydrocarbon fuels. The fuel to be processed is pressurized by fuel pump 6 and flows through conduits to one of the regenerable desulfurization reactors 10a or 10b (described, below), where sulfur is removed from the fuel and, optionally, where the molecular weight of the fuel is reduced. The fuel then passes from the reactor 10a/10b via a conduit through a junction that merges flow from both reactors 10a, 10b and then through a pressure/flow controller 14 into a gas-liquid separator 16 (described, below) where the liquid 18 is separated from the process stream via a separate conduit exiting the separator 16. The liquid 18 can be combusted to heat components of the desulfurization system or components of an associated power generation device. The liquid 18 can also be returned to the untreated fuel reservoir, to pass through the sulfur removal system a second time.

While fuel passes through the regenerable desulfurization reactor 10a, air passes through a second regenerable desulfurization reactor 10b to regenerate desulfurization agent in the reactor 10b and exits via line 12b. While FIG. 1 depicts two regenerable desulfurization reactors operating in parallel, any number of regenerable desulfurization reactors can be employed in the fuel processing system as the optimal number of regenerable desulfurization reactors will depend on the relative operation and regeneration times of the regenerable desulfurization reactors. The process stream leaving the gas-liquid separator 16 is passed via a conduit through a pressure/flow controller 20 and into the secondary desulfurization bed 22 to further reduce the sulfur content of the fuel. The conduit by which the gas stream exits the secondary desulfurization bed 22 can be coupled with a heat or power generation device, such as a fuel cell, where the gas stream is used as fuel.

The desulfurization reactors 10a, 10b include a regenerable desulfurization agent contained in a metallic vessel oriented so that the direction of fuel flow is parallel to the longest dimension of the vessel. The desulfurization reactors 10a, 10b can operate at a pressure from about 100 to 500 psig (from about 790 kPa to about 3.5 MPa), a and at a temperature of between about 300 and 600° C. In particular embodiments, the desulfurization reactors 10a, 10b operate at a pressure in the range from 200 and 350 psig (from about 1.5 kPa to about 2.5 MPa) and at a temperature from 350° C. to 475° C. Regeneration may occur at a pressure of between about 0 and 100 psig (between 100 and about 790 kPa), and at a temperature between about 300 and 600° C. (in particular embodiments from 350 to 475° C.).

Contained in the desulfurization reactors 10a, 10b is one or more inorganic materials (examples listed below) that are (a) well suited for removing sulfur through reaction or (b) well suited for reducing molecular weight through cracking and then removing sulfur through reaction. The cracking function may be served by acidic inorganic materials, such as protonated ZSM-5 zeolite, Beta zeolite and/or USY zeolite, commercially available from Süd-Chemie (Munich, Germany). Where distinct materials are used for cracking and for removing sulfur, the two materials can occupy different halves of the vessel; or, if in granular form, the two materials can be mixed together with a gradient wherein the concentrations of cracking material and desulfurization agent change through the vessel from its entrance to its exit. The material that is well suited for removing sulfur (i.e., the desulfurization agent) may also contain functionality that permits it to reduce the molecular weight of the fuel, thereby reducing or eliminating the need for a distinct second material that is well suited for reducing molecular weight.

The regenerable desulfurization agent can remove sulfur via reaction of the sulfur compounds with a transition metal or transition metal oxide species supported on an inorganic support, which is a porous high-surface-area structure, such as a honeycomb structure, having passages for gas transport therethrough. Where the agent is a metal oxide, desulfurization can occur via reactions 3 or 4, and regeneration is carried out via reaction 6. Where the agent is a transition metal, desulfurization can occur via reaction 5, and regeneration can be performed via reaction 6 and then exposing the $MO_x$ to the hydrocarbon, which produces $CO_2$ and $H_2O$ in addition to M. For some elements the metal may work better than the oxide. The transition metal species can be based upon Ti, V, Cr, Mn, Fe, Co, Ni, Cu, Zn, Ga, Zr, Nb, Mo, Ag, In, Sn, Hf, Ta, W or Pb, or a mixture thereof. Suitable supports for the regenerable desulfurization agent include materials such as alumina, silica, magnesia, titania, zirconia, silicon carbide and mixtures thereof. Sulfur can be removed according to the following typical reactions (where M represents a transition metal species):

$$MO_x + xCH_3SCH_3 \rightarrow MS_x + C_{2x}H_{4x} + xH_2O \qquad (3)$$

$$MO_x + xH_2S \rightarrow MS_x + xH_2O \qquad (4)$$

$$M + xCH_3SCH_3 \rightarrow MS_x + xC_2H_6 \qquad (5)$$

Regeneration can occur through the following general reaction:

$$MS_x + 3x/2 O_2 \rightarrow MO_x + xSO_2 \quad (6)$$

An exotherm that raises the absorbent temperature above the normal operating temperature may be observed during regeneration. In particular embodiments, the regenerable desulfurization agent is molybdenum oxide supported on a high-surface-area inorganic support. In one embodiment, the absorbent comprises 15 to 30 weight-% $MoO_3$ and 70 to 85 weight-% $Al_2O_3$ and has a surface are greater than 150 $m^2/g$ and a pore volume greater than 0.45 $cm^3/g$. In another embodiment, an effort is made to maximize the $MoO_3$ composition so as to be able to absorb as much sulfur as is reasonably possible.

Without wishing to be bound to a specific mechanism, it is believed that the $MoO_3/Al_2O_3$ absorbent acts to remove organosulfur compounds by preferentially binding these compounds via the S atom at a Mo site on the absorbent surface or within a pore. Adjacent support acidic groups may then contribute to catalytic cracking of the bound organosulfur compound, leaving $MoS_2$ and expelling hydrocarbon fragments. Any $H_2S$ produced during cracking will react with the $MoO_3$ according to the reaction (4). Conversion of $MoS_2$ to $MoO_3$ during regeneration is achieved by flowing air over the catalyst at temperatures above 200° C. The Mo—O—S phase diagram at 460° C. does not contain any sulfate phases, so complete conversion of $MoS_2$ to $MoO_3$ is achievable. Likewise, $WO_3$ and $Ta_2O_5$ are not convertible into sulfate phases.

The gas-liquid separator 16 is a metallic vessel that allows the condensable hydrocarbons to disengage from the gaseous hydrocarbon stream. The separator 16 can either be empty or filled with a bed of inert material that is permeable to gas flow. The inert material can be, for example, steel wool or metal (e.g., steel) rings or other form of packing material. The inert material can enhance heat transfer within the separator 16 and can serve as a nucleation site for evaporation or condensation within the separator 16. The gas-liquid separator 16, in one embodiment, operates at a pressure intermediate to that of the desulfurization reactors 10a, 10b and that of the secondary desulfurization agent bed 22, and at a temperature equivalent to or less than that of the desulfurization reactors 10a, 10b.

Because the residual sulfur-containing compounds in the processed diesel fuel are typically the higher-boiling substituted dibenzothiophenes (see FIGS. 3 and 4, discussed below in the description of Example 1), further reduction in the sulfur content of the processed fuel can be achieved by using the separator 16 to separate the processed diesel fuel into low- and higher-boiling fractions, delineated, for example, by a boiling point of 298° C. at ambient pressure, where the lower-boiling fractions boil at temperatures at or below 298° C., and the higher-boiling fractions boil only at temperatures above 298° C. (at the given pressure). The majority of the fuel will be contained in the lower-boiling fraction, but the majority of the residual sulfur will be contained in the higher-boiling fraction, as 4-methyldibenzothiophene and more substituted dibenzothiophenes possess boiling points greater than 298° C. The concentration of sulfur in the lower-boiling product will be significantly lower than that of the fuel prior to separation. The sulfur-containing higher-boiling fraction can be recycled and passed through the desulfurization system again in order to further reduce the amount of refractory sulfur species, or the higher-boiling fraction can be combusted to provide heat for the desulfurization system or an associated power generation device. The exact operating conditions of the gas-liquid separator 16 may be dictated by the amount of combustible liquid required to maintain the temperature of the fuel desulfurization system and other chemical processing system components. The pressure and temperature can be manipulated in the separator 16 to control the dividing line between the higher-boiling fraction (liquid) and lower-boiling fraction (gas). For example, the temperature in the separator 16 can be raised to enable additional components that were previously at the lower end of the "higher-boiling fraction" to vaporize and become part of the "lower-boiling fraction."

If the desulfurization system depicted in FIG. 1 is operated with a gaseous hydrocarbon feed, the gas-liquid separator 16 is immaterial and need not be a component of the desulfurization system. In which case, heat for the desulfurization system components may be provided by combustion of the gaseous hydrocarbon feed rather than by the combustion of stream 18.

Use of a secondary non-regenerable desulfurization reactor 22 downstream of the gas-liquid separator 16 in the configuration presented in FIG. 1 will improve the performance of the desulfurization system by reducing the sulfur content of the fuel compared to what would be obtained without the secondary desulfurization agent reactor 22. Because the majority of the sulfur is removed in the regenerable desulfurization reactors 10a, 10b, the size of the secondary desulfurization reactor 22 can be smaller, though its design can otherwise be the same as the regenerable desulfurization reactors 10a, 10b. Transition metals and metal oxides deposited on inorganic supports can be used for the secondary desulfurization reactor 22, and the transition metals can be the same or similar to those used in the primary desulfurization reactors 10a, 10b.

EXEMPLIFICATION

Example 1

Figure 2:
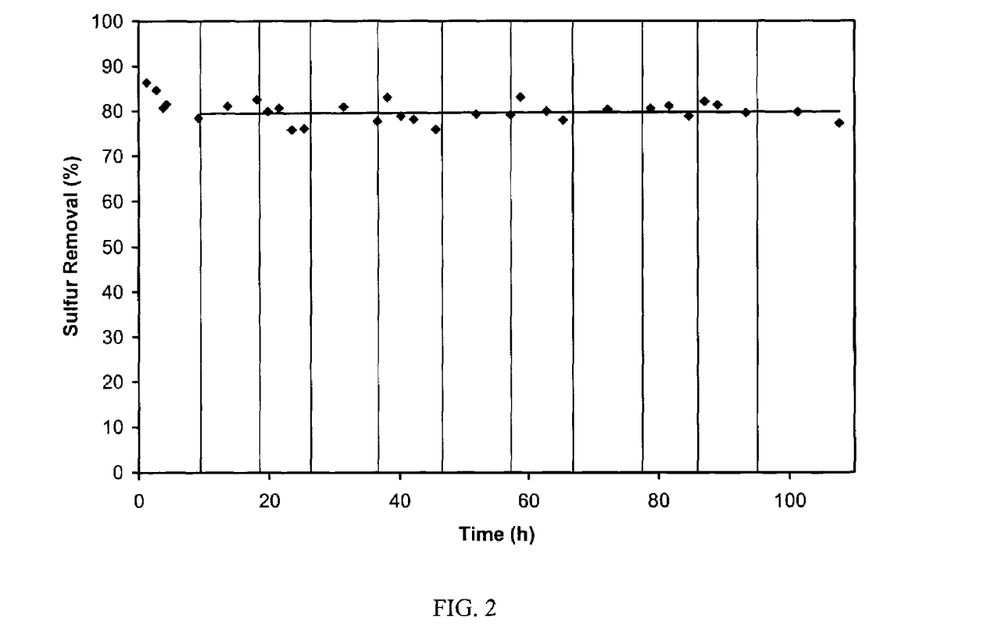
FIG. 2 is a chart illustrating desulfurization with a molybdenum oxide/aluminum oxide absorbent over time.

Operation of a regenerable desulfurization reactor in the absence of the separator and the secondary desulfurization agent bed has been demonstrated to produce a significant reduction in the sulfur content of hydrocarbon fuels. A regenerable desulfurization reactor containing an 18 weight-% $MoO_3/Al_2O_3$ absorbent (wherein the $MoO_3$ is 18 weight % and the $Al_2O_3$ is 82 weight %) prepared by impregnating the $MoO_3$ into a porous $Al_2O_3$ substrate was used in this example. A commercial diesel fuel containing 300 ppm sulfur was passed through the regenerable desulfurization reactor at 200 psig (about 1.5 MPa), 400° C. and a liquid hourly space velocity of 1.1 $h^{-1}$. The resulting liquid product contained 60 ppm sulfur, which is an 80% reduction in sulfur content relative to the diesel fuel before this treatment. Following 10 hours of sulfur absorption, diesel flow to the reactor was terminated and air flow was initiated and continued for 2 hours at 400° C. Significant evolution of $SO_2$ was observed during regeneration of the desulfurization agent. FIG. 2 shows the degree of sulfur removal observed in the liquid product through ten of these operation-regeneration cycles. The stability and regenerability of the desulfurization agent was thus demonstrated.

Figure 3:
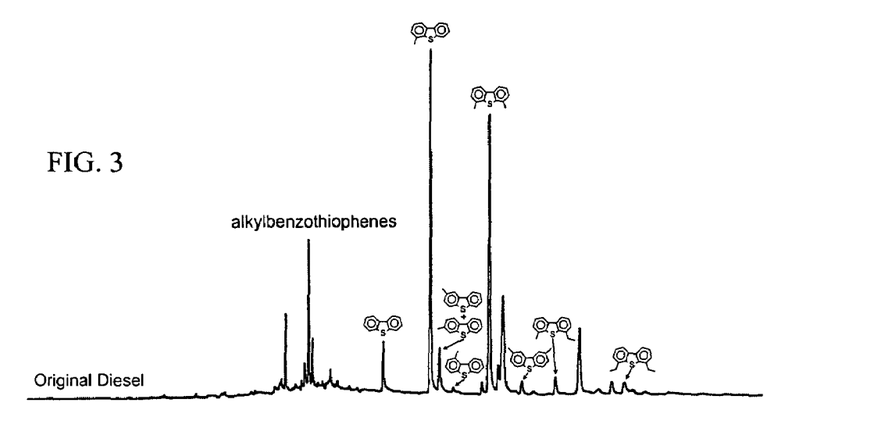
FIG. 3 is a sulfur-specific gas chromatogram of diesel fuel.
Figure 4:
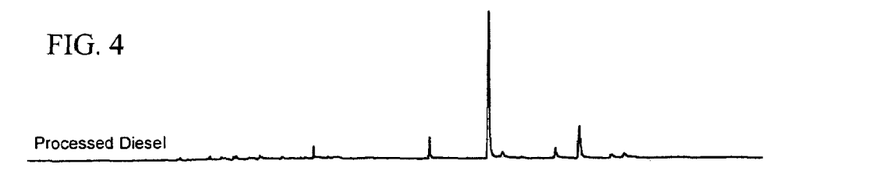
FIG. 4 is a sulfur-specific gas chromatogram of desulfurized diesel fuel.

FIGS. 3 and 4 present sulfur-specific gas chromatograms of the untreated commercial diesel fuel and desulfurized liquid product containing 60 ppm sulfur from the procedure of the preceding paragraph. The unprocessed diesel fuel consists predominantly of substituted dibenzothiophenes, with some alkylbenzothiophenes also present. In the desulfurized fuel, the predominant species are 4-methyldibenzothiophene, 4,6-dimethyldibenzothiophene and other dialkyldibenzothiophenes, particularly those with substitutions at the 4,6 position, as ligands in these positions likely inhibit interaction of the sulfur atom with the desulfurization agent surface. Although dibenzothiophenes are the species that are typically the most difficult to remove via conventional desulfurization techniques, such as hydrodesulfurization, this process was able to effect a significant reduction in the concentration of these refractory species.

Figure 5:
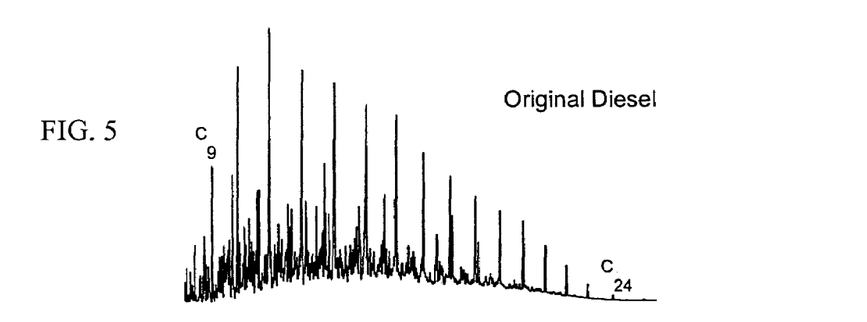
FIG. 5 is a carbon-specific gas chromatogram of diesel fuel.
Figure 6:
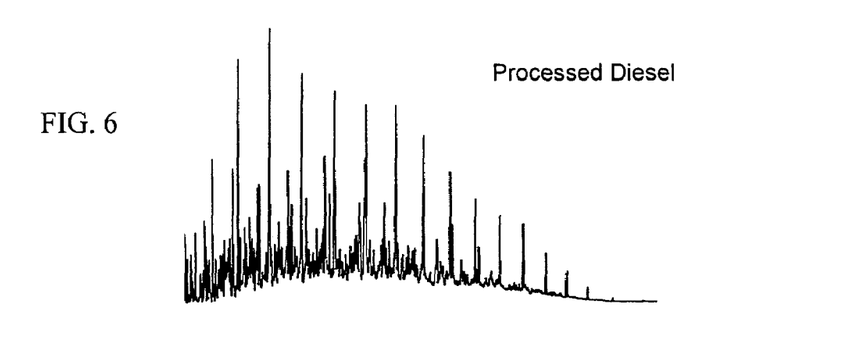
FIG. 6 is a carbon-specific gas chromatogram of desulfurized diesel fuel.

Although effective removal of the sulfur from the fuel may be enhanced by cracking the organosulfur species into smaller hydrocarbons, an overall reduction in the molecular weight of the hydrocarbons that constitute the fuel may not be desirable for many applications. The yield of liquid fuel from the experiment, the results of which are depicted in FIGS. 2, 3 and 4, was 99.6%. The high yield indicates that very little gas production or coke formation occurs during the desulfurization reaction. Carbon-specific chromatograms of the fuels presented in FIGS. 3 and 4 are provided in FIGS. 5 and 6. The highly paraffinic nature of the diesel fuel is evident in the chromatograms' intense, equally spaced n-alkane peaks from $C_9$ to $C_{24}$. The chromatogram of the desulfurized diesel is nearly identical to that of its parent fuel, indicating that the hydrocarbon distribution of the liquid product has not been significantly altered from that of the original diesel fuel.

Example 2

One example of the preparation of a regenerable desulfurization agent is found in the synthesis of a 20 wt % $MoO_3/Al_2O_3$ absorbent. An aqueous solution of ammonium paramolybdate was impregnated into a high surface area (200 $m^2/g$) $Al_2O_3$ substrate (SAB, available from UOP of Des Plaines, Ill., USA). In this case, a solution of 30.7 g ammonium paramolybdate in 100 g water was impregnated into a 75 g $Al_2O_3$ substrate. The substrate was impregnated by adding enough ammonium paramolybdate solution to fully wet the absorbent substrate and then drying under vacuum. This procedure was repeated until the entire impregnating solution had been loaded onto the substrate. The material was then calcined in air at 550° C. to decompose the precursor to $MoO_3$. This desulfurization agent possessed a surface area of greater than 150 $m^2/g$ and a total pore volume greater than 0.45 $cm^3/g$.

Table 1 presents data characterizing the performance of the regenerable desulfurization reactor when commercial diesel fuel was passed through the reactor at 400° C., 300 psig (about 2.2 MPa) and a liquid hourly space velocity of 0.6 $h^{-1}$. In this instance, passing the diesel fuel through the reactor reduced the fuel's sulfur content from 330 ppm to 33 ppm (i.e., a 90% reduction in sulfur content), and the yield of liquid fuel from the desulfurization system was 98.8%.

TABLE 1

Desulfurization of Diesel Fuel

| Time (h) | Fuel Feed Volume (mL) | Liquid Product Volume (mL) | Liquid Product Sulfur Content (ppmw) | Gaseous Product Sulfur Content (ppmv) |
|---|---|---|---|---|
| 1.0 | 25 | 28 | 29 | <0.05 |
| 2.1 | 52 | 54 | 32 | <0.05 |
| 4.4 | 110 | 111 | 34 | <0.05 |
| 6.3 | 157 | 155 | 33 | <0.05 |
| 7.7 | 192 | 191 | 30 | <0.05 |
| 22.6 | 563 | 554 | 34 | 0.4 |
| 24.6 | 613 | 604 | 37 | — |
| 27.7 | 651 | 643 | 26 | — |

Example 3

The composition of the desulfurization agent contained in the regenerable desulfurization reactor plays a significant role in the amount of sulfur that can be removed from a fuel. The amounts of dibenzothiophene, 4-methyldibenzothiophene and 4,6-dimethyldibenzothiophene removed from a synthetic fuel containing 350 ppm sulfur at 425° C., 200 psig (about 1.5 MPa) and a liquid hourly space velocity of 1.1 $h^{-1}$ are shown in Table 2 for a variety of $Al_2O_3$-impregnated metal oxide absorbents.

TABLE 2

Sulfur Removal Activity of Impregnated Absorbents

| Absorbent | Sulfur Removal (%) |
|---|---|
| 19 wt % $MoO_3/Al_2O_3$ | 65 |
| 29 wt % $Ta_2O_5/Al_2O_3$ | 35 |
| 22 wt % $WO_3/Al_2O_3$ | 31 |
| 16 wt % $ZnTiO_3/Al_2O_3$ | 28 |
| 21 wt % $ZnO/Al_2O_3$ | 11 |
| 11 wt % $MnO_2/Al_2O_3$ | 8 |

Example 4

In another embodiment, the desulfurization reactors contained the regenerable desulfurization agent and a catalyst that served to reduce the molecular weight of the fuel being processed. A desulfurization reactor containing three-parts regenerable 23 wt % $MoO_3/Al_2O_3$ desulfurization agent, one-part protonated zeolite ZSM-5, and one-part protonated zeolite Beta was employed in conjunction with a separator to reduce the sulfur content of a fuel being passed to a steam reformer. Over the course of 1013 hours and 41 regeneration cycles, the sulfur content of the reformate exiting the steam reformer was between 50 and 150 parts per billion, by volume (ppbv). The sulfur content of the fuel passing from the desulfurization system to the reformer was calculated to be less than 1.5 parts per million, by weight (ppmw). This example demonstrates the regenerability of the desulfurization agent as well as the added benefit of including the separator in the desulfurization system. The acidic cracking catalyst included in the desulfurization reactor generates $H_2S$ from which sulfur is subsequently absorbed by the desulfurization agent. Thus, the regenerable desulfurization agent is capable of absorbing sulfur from $H_2S$ as well as from organosulfur species.

Example 5

In another example, the desulfurization system included a regenerable desulfurization reactor containing three parts 22 wt % $MoO_3/Al_2O_3$ regenerable desulfurization agent, two parts protonated zeolite ZSM-5, two parts protonated zeolite Beta, a separator, and a secondary desulfurization reactor containing $MoO_3/Al_2O_3$ regenerable desulfurization agent. With the desulfurization system operating at 400° C. and 300 psig (about 2.1 MPa), the sulfur content of a 300 ppm commercial diesel fuel passed through the system was reduced to below detectable limits, as detailed in Table 3. The lower-boiling stream formed 75% of the overall product streams from the desulfurization system. The regenerable desulfurization agent was regenerated with 0.5 standard liters per minute (SLPM) of air at 400° C. between each cycle.

TABLE 3

Characteristics of Product Streams from Desulfurization System

| | | | Desulfurized Stream | | | Higher-boiling Stream | | |
|---|---|---|---|---|---|---|---|---|
| Cycle | Time (hours) | Volume Fed ($cm^3$) | Liquid Volume ($cm^3$) | Liquid Sulfur Conc. (ppmw) | Gaseous Sulfur Conc. (ppmv) | Liquid Volume ($cm^3$) | Liquid Sulfur Conc. (ppmw) | Fraction of Feed |
| 1 | 9.2 | 229 | 32 | <10 | <0.05 | 58 | 200 | 0.25 |
| 2 | 8.1 | 202 | 26 | <10 | <0.05 | 52 | — | 0.26 |
| 3 | 8.4 | 209 | 29 | <10 | <0.05 | 51 | 222 | 0.24 |

While this invention has been shown and described with references to particular embodiments thereof, those skilled in the art will understand that various changes in form and details may be made therein without departing from the scope of the invention, which is limited only by the following claims.

What is claimed is:

1. A process for removing sulfur from a sulfur-containing hydrocarbon fuel comprising:
    contacting a hydrocarbon fuel in the absence of added hydrogen at a temperature in the range of 350 to 600° C. and at a pressure in the range from about 100 kPa to about 3.5 MPa with a primary desulfurization agent in the form of a metal oxide selected from the group consisting of molybdenum oxide, tantalum oxide, tungsten oxide and combinations thereof to produce a reaction between the hydrocarbon fuel and the primary desulfurization agent that removes sulfur from the hydrocarbon fuel by replacing oxygen in the metal oxide with the sulfur from the hydrocarbon fuel to form a metal sulfide; and
    regenerating the primary desulfurization agent by exposing it to oxygen at a temperature in the range of 350 to 600° C. to replace the sulfur in the metal sulfide with oxygen to revert back to the metal oxide.

2. The process of claim 1, further comprising the step of contacting the hydrocarbon fuel with an acidic inorganic material at a temperature in the range of 300 to 600° C. and at a pressure in the range of about 790 kPa to about 3.5 MPa to effect a reduction in the average molecular weight of the hydrocarbon fuel.

3. The process of claim 2, wherein the acidic inorganic material is a zeolite.

4. The process of claim 3, wherein the acidic inorganic material is a mixture of H-ZSM-5 and H-Beta zeolites.

5. The process of claim 1, further comprising the step of separating a higher-boiling fraction and a lower-boiling fraction from the hydrocarbon fuel after the hydrocarbon fuel contacts the primary desulfurization agent.

6. The process of claim 5, wherein the higher-boiling fraction and lower-boiling fraction are separated at a temperature in the range of 200 to 400° C. and at a pressure in the range from about 100 kPa to about 2.9 MPa.

7. The process of claim 5, further comprising the step of contacting the lower-boiling fraction with a secondary desulfurization agent.

8. The process of claim 7, wherein the secondary desulfurization agent is a metal or metal oxide absorbent.

9. The process of claim 8, wherein the secondary desulfurization agent is $Ni/Al_2O_3$ or $Cu/ZnO/Al_2O_3$.

10. The process of claim 5, wherein the higher-boiling fraction derived is combusted to provide heat that is transported to the primary desulfurization agent.

11. The process of claim 5, wherein the higher-boiling fraction is recycled and passed through the desulfurization system a second time.

12. The process of claim 1, wherein the hydrocarbon fuel comprises gasoline, kerosene, diesel fuel, jet fuel, heating oil or combinations thereof.

13. The process of claim 1, wherein the hydrocarbon fuel includes sulfur at a concentration greater than 100 parts per million by weight.

14. The process of claim 1, wherein the hydrocarbon fuel contacts the primary desulfurization agent at a pressure in the range from about 1.5 MPa to about 2.5 MPa and at a temperature in the range of 350° C. to 475° C.

15. The process of claim 1, wherein organosulfur compounds in the hydrocarbon fuel are cracked to produce $H_2S$ and cracked hydrocarbon products before or while the hydrocarbon fuel contacts the primary desulfurization agent.

16. The process of claim 1, wherein the metal oxide is supported on an inorganic support.

17. The process of claim 1, wherein the metal in the metal oxide is selected from the group of elements consisting of Mo, W, and mixtures thereof, and wherein the metal oxide is supported on an inorganic support.

18. The process of claim 1, wherein the primary desulfurization agent comprises $MoO_3$.

19. The process of claim 18, wherein the $MoO_3$ is coated on an $Al_2O_3$ substrate.

20. The process of claim 19, wherein the primary desulfurization agent comprises:
    15-30 weight-% $MoO_3$; and
    70-85 weight-% of a combination of $Al_2O_3$ and another transition metal species.

21. The process of claim 19, wherein the primary desulfurization agent is 15-30 weight-% $MoO_3$ and 70-85 weight-% $Al_2O_3$.

22. The process of claim 18, wherein the primary desulfurization agent comprises at least about 90% $MoO_3$.

23. The process of claim 1, wherein the primary desulfurization agent is regenerated by exposing it to oxygen at 350 to 475° C.

24. The process of claim 1, wherein the primary desulfurization agent is regenerated by exposing it to oxygen at a temperature that is substantially the same as that at which the primary desulfurization agent removes sulfur from the hydrocarbon fuel.

25. The process of claim 1, wherein in the reaction between the hydrocarbon fuel and the primary desulfurization agent, the primary desulfurization agent abstracts sulfur from the hydrocarbon fuel.

26. The process of claim 1, wherein the amount of at least one of dibenzothiophene, alkyldibenzothiophene compounds and dialkyldibenzothiophene compounds in the hydrocarbon fuel is reduced by the process.

* * * * *